United States Patent
Sato

(10) Patent No.: US 11,458,400 B2
(45) Date of Patent: Oct. 4, 2022

(54) INFORMATION PROCESSING DEVICE, INFORMATION PROCESSING METHOD, AND PROGRAM FOR GENERATING AN ADDED RELATED TO A PREDICTED FUTURE BEHAVIOR

(71) Applicant: SONY CORPORATION, Tokyo (JP)

(72) Inventor: Tetsuro Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/253,901

(22) PCT Filed: Mar. 26, 2019

(86) PCT No.: PCT/JP2019/012682
§ 371 (c)(1),
(2) Date: Dec. 18, 2020

(87) PCT Pub. No.: WO2020/012727
PCT Pub. Date: Jan. 16, 2020

(65) Prior Publication Data
US 2021/0268386 A1    Sep. 2, 2021

(30) Foreign Application Priority Data
Jul. 11, 2018   (JP) ............................. JP2018-131410

(51) Int. Cl.
| *A63F 13/67* | (2014.01) |
| *A63F 13/213* | (2014.01) |
| *G06N 5/04* | (2006.01) |
| *G11B 27/00* | (2006.01) |
| *G06V 40/20* | (2022.01) |
| *A63B 69/36* | (2006.01) |

(52) U.S. Cl.
CPC .............. *A63F 13/67* (2014.09); *A63B 69/36* (2013.01); *A63F 13/213* (2014.09); *G06N 5/04* (2013.01); *G06V 40/20* (2022.01); *G11B 27/005* (2013.01)

(58) Field of Classification Search
CPC ..... A63F 13/67; A63F 13/213; G11B 27/005; G06N 5/04; G06V 40/20
See application file for complete search history.

(56) References Cited

U.S. PATENT DOCUMENTS

| 8,823,701 | B2* | 9/2014 | Aldridge ............... A63F 13/358 |
| | | | 345/419 |
| 2008/0096667 | A1* | 4/2008 | Konuma ................. A63F 13/12 |
| | | | 463/42 |

(Continued)

FOREIGN PATENT DOCUMENTS

| JP | 2011-242458 A | 12/2011 |
| JP | 2012-005773 A | 1/2012 |

(Continued)

*Primary Examiner* — David L Lewis
*Assistant Examiner* — Shauna-Kay Hall
(74) *Attorney, Agent, or Firm* — Paratus Law Group, PLLC

(57) ABSTRACT

An information processing device including: a behavior recognition device that recognizes a behavior; a prediction unit that predicts a future behavior using a recognition result of the behavior recognition device; an added value generation unit that generates an added value related to the predicted future behavior; and a presentation unit that presents the generated added value.

10 Claims, 18 Drawing Sheets

(56) References Cited

U.S. PATENT DOCUMENTS

2012/0220233 A1     8/2012   Teague et al.
2016/0371547 A1*   12/2016   Valentino, III ........ G06V 40/20
2017/0036115 A1*    2/2017   Barajas Gonzalez ... G06F 3/013

FOREIGN PATENT DOCUMENTS

| JP | 2013-103010 A | 5/2013 |
| JP | 2014-517255 A | 7/2014 |
| WO | WO 2006/057185 A1 | 6/2006 |
| WO | WO 2008/111245 A1 | 9/2008 |

* cited by examiner

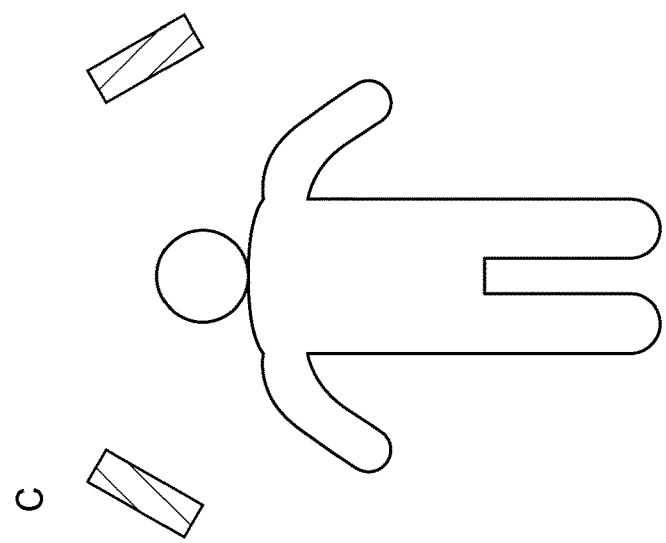
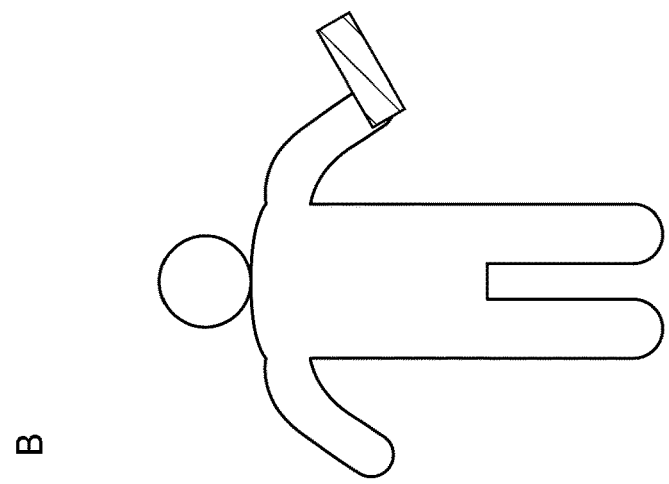
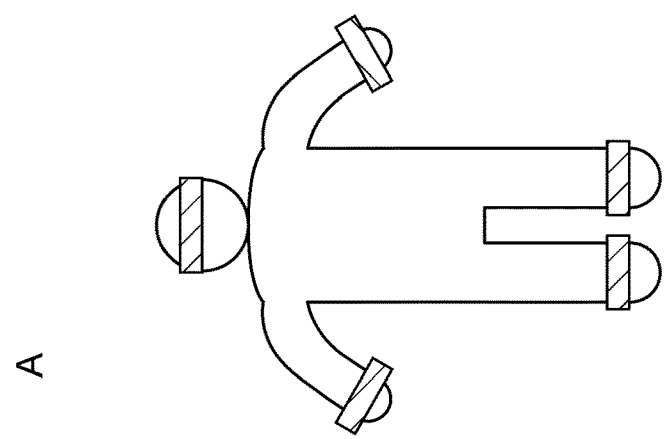
FIG. 2 x1    x2

INFORMATION PROCESSING DEVICE, INFORMATION PROCESSING METHOD, AND PROGRAM FOR GENERATING AN ADDED RELATED TO A PREDICTED FUTURE BEHAVIOR

CROSS REFERENCE TO PRIOR APPLICATION

This application is a National Stage Patent Application of PCT International Patent Application No. PCT/JP2019/012682 (filed on Mar. 26, 2019) under 35 U.S.C. § 371, which claims priority to Japanese Patent Application No. 2018-131410 (filed on Jul. 11, 2018), which are all hereby incorporated by reference in their entirety.

TECHNICAL FIELD

The present technology relates to an information processing device, an information processing method, and a program that can predict a future behavior of a person and provide a new added value on the basis of the prediction result.

BACKGROUND ART

Digitally detecting and recording the movement of a person or the like is known as motion capture technology. Known capture technologies includes an optical system that uses multiple cameras and reflective markers, an inertial sensor system in which a gyro sensor and an accelerometer are attached to each part of the body for measurement, a video camera system in which videos captured by video cameras are analyzed, and the like.

For example, Patent Document 1 describes that in order to make exercise such as strength training, rehabilitation, and shape-up effective, sufficient feedback on the effectiveness of the exercise is given to the person who exercises. That is, the feedback on the effectiveness of the exercise is visibly presented to the user.

CITATION LIST

Patent Document

Patent Document 1: Japanese Patent Application Laid-Open No. 2013-103010

SUMMARY OF THE INVENTION

Problems to be Solved by the Invention

The technology described in Patent Document 1 recognizes the current exercise and feeds back the effectiveness of the exercise, but does not generate any new added value.

Hence, the present technology provides an information processing device, an information processing method, and a program that can predict a future behavior and generate a new added value from the prediction result.

Solutions to Problems

The present technology is as information processing device including:
a behavior recognition device that recognizes a behavior;
a prediction unit that predicts a future behavior using a recognition result of the behavior recognition device;
an added value generation unit that generates an added value related to the predicted future behavior; and
a presentation unit that presents the generated added value.

The present technology is an information processing method including:
recognizing a behavior by a behavior recognition device;
predicting a future behavior by a prediction unit using a recognition result of the behavior recognition device;
generating an added value related to the predicted future behavior by an added value generation unit; and
presenting the generated added value by a presentation unit.

The present technology is a program that causes a computer to execute an information processing method including:
recognizing a behavior by a behavior recognition device;
predicting a future behavior by a prediction unit using a recognition result of the behavior recognition device;
generating an added value related to the predicted future behavior by an added value generation unit; and
presenting the generated added value by a presentation unit.

Effects of the Invention

According to at least one embodiment, it is possible to provide an added value related to a future behavior. Note that the effect described herein is not necessarily limited, and the effect may be any of those described in. the present technology or a different effect.

BRIEF DESCRIPTION OF DRAWINGS

FIG. 2 is a diagram showing methods of acquiring sensor information of the user.

MODE FOR CARRYING OUT THE INVENTION

Figure 1:
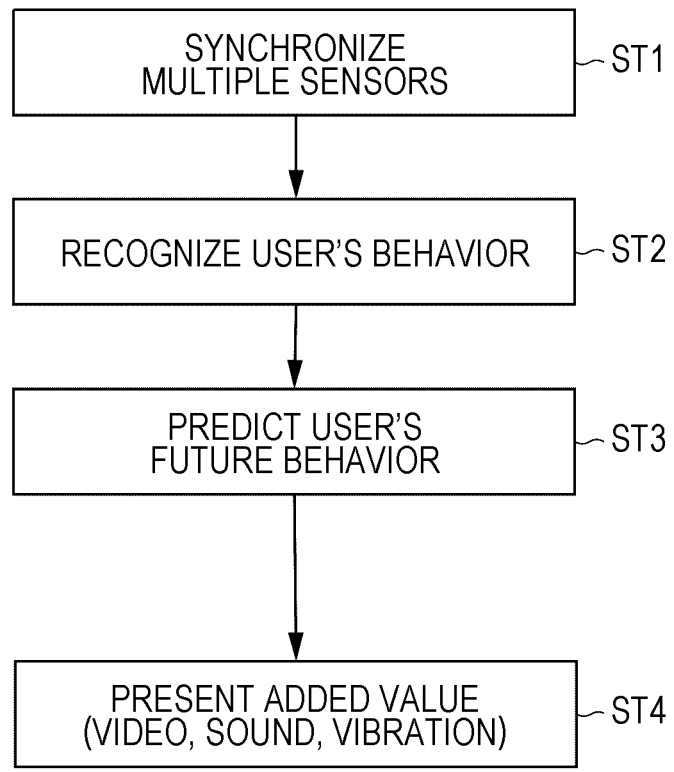
FIG. 1 is a flowchart showing the basic processing flow of an information processing device according to the present technology.

Hereinafter, embodiments and the like of the present technology will be described with reference to the drawings. Note that the description will be given in the following order.
<1. Outline of present technology>
<2. First embodiment>
<3. Second embodiment>
<4. Third embodiment>
<5. Fourth embodiment>
<6. Fifth embodiment>
<7. Modification>

The embodiments and the like described below are preferable specific examples of the present technology, and the contents of the present technology are not limited to these embodiments and the like.
<1. Outline of Present Technology>

The present technology has the following features.
1 By predicting the user's behavior in advance, an added value is given to a predicted behavior for a few seconds or to a situation caused by the predicted behavior. Thus, a new value is provided to the user.
2 Especially in virtual reality (VR) games that are played in real time, since the user's behavior a few seconds later can be predicted, the video is modified for a few seconds so that it does not differ largely from the actual behavior, and the following experience can be provided.

When an interaction of directly touching a virtual object in VR occurs, an illusion of a reaction force is created (first embodiment described later).

A scene that is difficult to time and rarely occur can be arbitrarily created (second embodiment described later).
3 By taking advantage of the features of 1, the technology can be applied not only to VR but also to the following cases in game applications.

Mitigation of communication failures (third embodiment described later).

The technology is used by a computer to entertain the player and acquire behavior prediction of the opponent in a battle game (fourth embodiment and fifth embodiment described later).

The basic processing flow of the present technology will be described with reference to the flowchart of FIG. 1.

Step ST1: Synchronize multiple sensors.

Step ST2: Collect user behavior information by sensing and recognize the user's behavior.

Step ST3: Use current behavior to predict behavior in the future such as a few seconds ahead.

Step ST4: Provide an optimal added value according to the surrounding situation caused by the predicted behavior. The added value is presented through the five senses.

Moreover, the processing of each step will be described.

In step ST2, in order to recognize the user's behavior by sensing, current useful information (hereinafter appropriately referred to as sensor information) is acquired. Useful sensor information includes position and posture (body and tools operated by body), temperature, sound, pulse, acceleration, vibration, and the like. In step ST2, various motion capture techniques can be applied and a video camera may be used as the sensor.

FIG. 2 shows a method of acquiring sensor information of the user. FIG. 2A shows an example in which sensor information is acquired by sensors (hatched blocks) attached to the user's limbs. In FIG. 2B, sensor information is acquired from a sensor (hatched block) held by the user. As the sensor, a gyro sensor, an accelerometer, or the like can be used. FIG. 2C shows an example of acquiring sensor information from sensors (hatched blocks) such as video cameras provided around the user.

Figure 3:
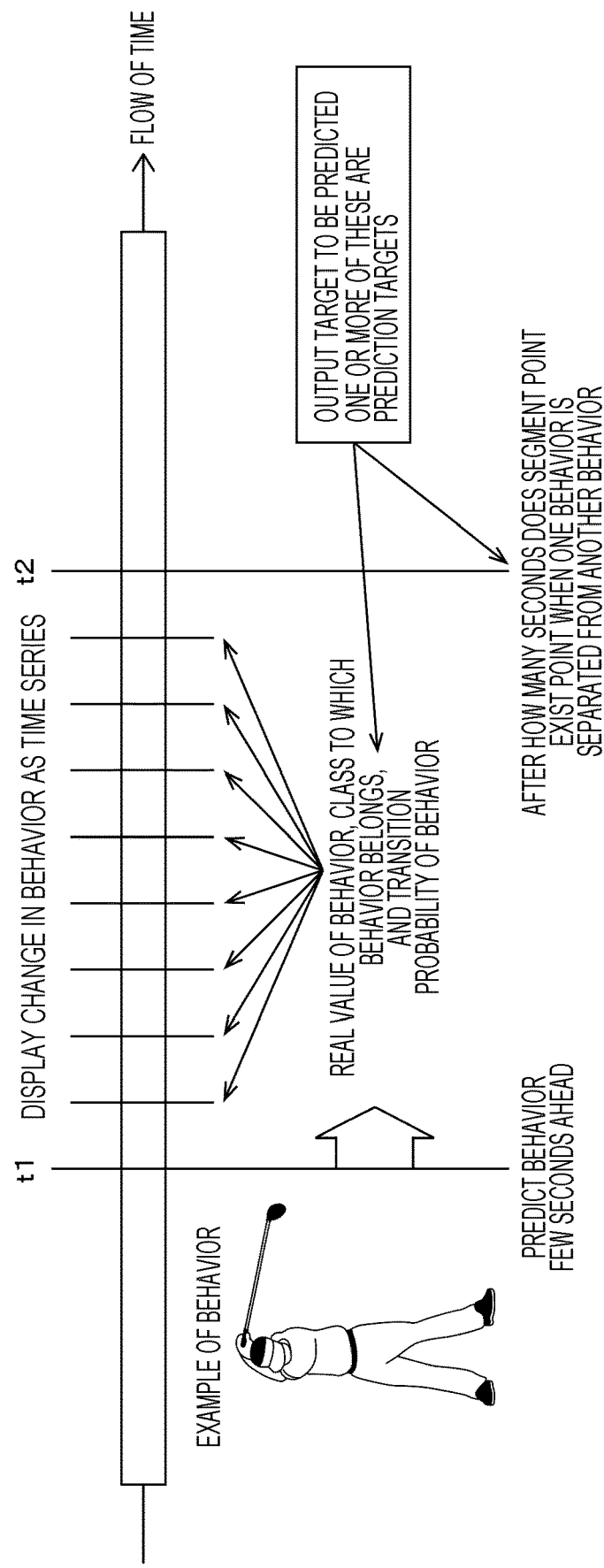
FIG. 3 is a diagram for describing processing of predicting an immediate behavior of the user by using the acquired sensor information.

In step ST3, the acquired sensor information is input to predict the user's immediate (e.g., up to few seconds ahead) behavior. The above will be described with reference to FIG. 3. The horizontal direction in FIG. 3 shows the passage of time, and a behavior at time t1 such as a top position of a golf swing is used to predict a behavior at time t2 several seconds thereafter.

Between times t1 and t2, one or more of "real value of behavior", "class to which behavior belongs", and "transition probability of behavior" are predicted. The "real value of behavior" is coordinate information representing a posture. As for the "class to which behavior belongs", in a golf swing, for example, classes include "address", "takeback", "top", "downswing", "impact", "follow through", and "finish". The "transition probability of behavior" is the probability (%) of the next behavior to occur.

Note that the prediction target is not limited to a physical motion that directly expresses the behavior, but also includes an intention of the behavior that can be predicted from sensor information or a database or past behavior.

The output is treated as a time point a few seconds ahead or a time series up to a few seconds ahead, and is output as a real number, a class, or a probability, for example.

Additionally, it is possible to predict how many seconds ahead a behavior at the start of prediction will end (defined as segment point of motion). A segment point of a motion is a timing at which one behavior is separated from another behavior.

Figure 4:
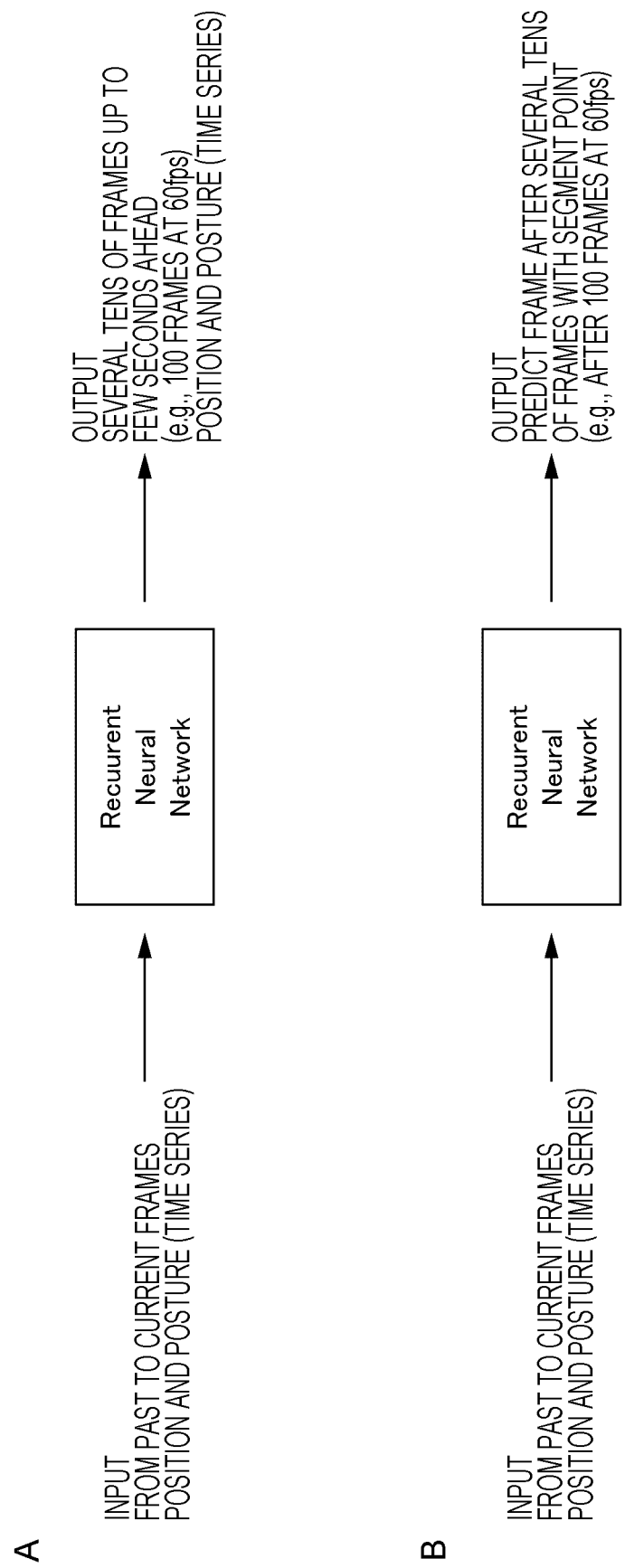
FIGS. 4A and 4B are block diagrams for describing a configuration for predicting a future behavior.

In a case of predicting a behavior up to a few seconds ahead from the user's current behavior, specifically, the processing is performed as shown in FIGS. 4A and 4B. In an approach of predicting a body motion trajectory up to a few seconds ahead, it is possible to implement a model as shown in FIG. 4A using the Recurrent Neural Network.

The position and orientation (time series) of past to current frames are input. Here, the position and posture include the whole body, a part of the body, and tools to be operated by the body. The Recurrent Neural Network outputs the position and orientation (time series) of any part desired to be predicted for several tens of frames (e.g., 100 frames at 60 fps) up to a few seconds ahead.

On the other hand, as shown in FIG. 4B, the model implementation using the Recurrent Neural Network can be similarly considered for an approach of predicting the frame with a segment point. The position and orientation (time series) of past to current frames are input. The Recurrent Neural Network predicts the class to which a behavior that occurs in a frame after several tens of frames with a segment point and a behavior that occurs at the segment point belong. A segment point is a point at which a behavior at the time of estimation is distinguished from another behavior.

In step ST4, the predicted behavior and the optimal added value according to the surrounding situation caused by the predicted behavior are provided through the five senses. An added value is an external stimulus newly obtained by the user as compared with a case where the predicted behavior is performed as it is. An External stimulus is presented in a form that appeals to the five senses (e.g. (vision).

Figure 5:
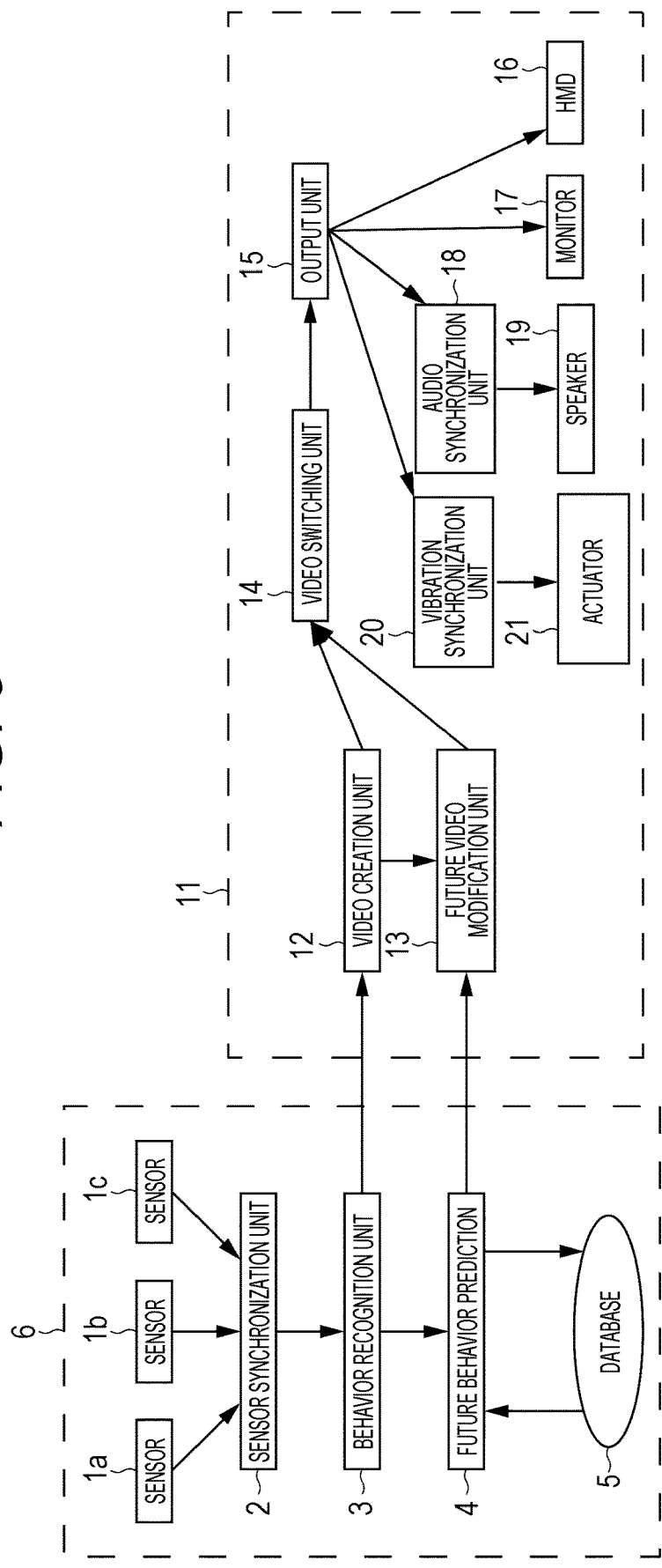
FIG. 5 is a block diagram showing an example of the overall configuration of the information processing device according to the present technology.

FIG. 5 shows a functional block diagram in a case of presenting a video as an added value. FIG. 5 shows a configuration provided for a single user. Detection information indicating the position and posture of the whole body or a specific part is acquired by multiple, such as three, sensors $1a$, $1b$, and $1c$. The detection information is supplied to a sensor synchronization unit 2, and the sensors are synchronized with each other. Sensor information from the sensor synchronization unit 2 is supplied to a behavior recognition unit 3. The behavior recognition unit 3 generates information on the position and posture as well as behavior of the whole body or a specific part.

The behavior information generated by the behavior recognition unit 3 is supplied to a future behavior prediction unit 4 and a video creation unit 12. The video creation unit 12 is included in an added value generation and presentation unit 11 surrounded by a broken line. The video creation unit 12 creates a video that matches the position and posture as well as behavior. The video created by the video creation unit 12 (appropriately referred to as normal video) is supplied to a video switching unit 14.

The future behavior prediction unit 4 learns time-series data of behaviors accumulated in a database 5 and labeling data of the behaviors, and creates position and posture information of the whole body or a specific part up to a few seconds ahead. The database 5 accumulates information such as the past, a time series of the whole body or a specific position/posture performed by a specific individual or any number of people, and a time series of past behavior. The information on the position and posture of the whole body or a specific part up to a few seconds ahead created by the future behavior prediction unit 4 is supplied from the future behavior prediction unit 4 to a future video modification unit 13. The partial configuration (surrounded by broken line) including the sensors $1a$, $1b$, and $1c$, the sensor synchronization unit 2, the behavior recognition unit 3, the future behavior prediction unit 4, and the database 5 described above is included in a sensing and future predicting unit 6.

The future video modification unit 13 modifies a normal video in advance according to the prediction result to form a video a few seconds ahead. The video modified by the future video modification unit 13 is supplied to the video switching unit 14. The video switching unit 14 switches between a normal video from the video creation unit 12 and a modified video from the future video modification unit 13 and outputs one of the videos. Note that the videos may be faded and faded out at the time of switching by the video switching unit 14. Moreover, instead of switching the videos, the two videos may be mixed (superimposed) with a set mixing ratio. The output of the video switching unit 14 is supplied to an output unit 15.

A reproduction device or an actuator is connected to the output unit 15. In FIG. 5, as presentation devices, a head mounted display (HMD) 16, a monitor 17, a speaker 19 connected through an audio synchronization unit 18, and an actuator 21 for generating vibration connected through a vibration synchronization unit 20 are connected. Video and audio are presented to the user by the HMD 16. Goggles may be used instead of the HMD 16. The user can see video displayed by the monitor 17. The user can listen to audio information from the speaker 19. The user can feel vibration generated by the actuator 21. These reproduction devices or actuators can provide an added value to the user. Note that it is not necessary to include all of the HMD 16, the monitor 17, the speaker 19, and the actuator 21 shown in FIG. 5.

Figure 6:
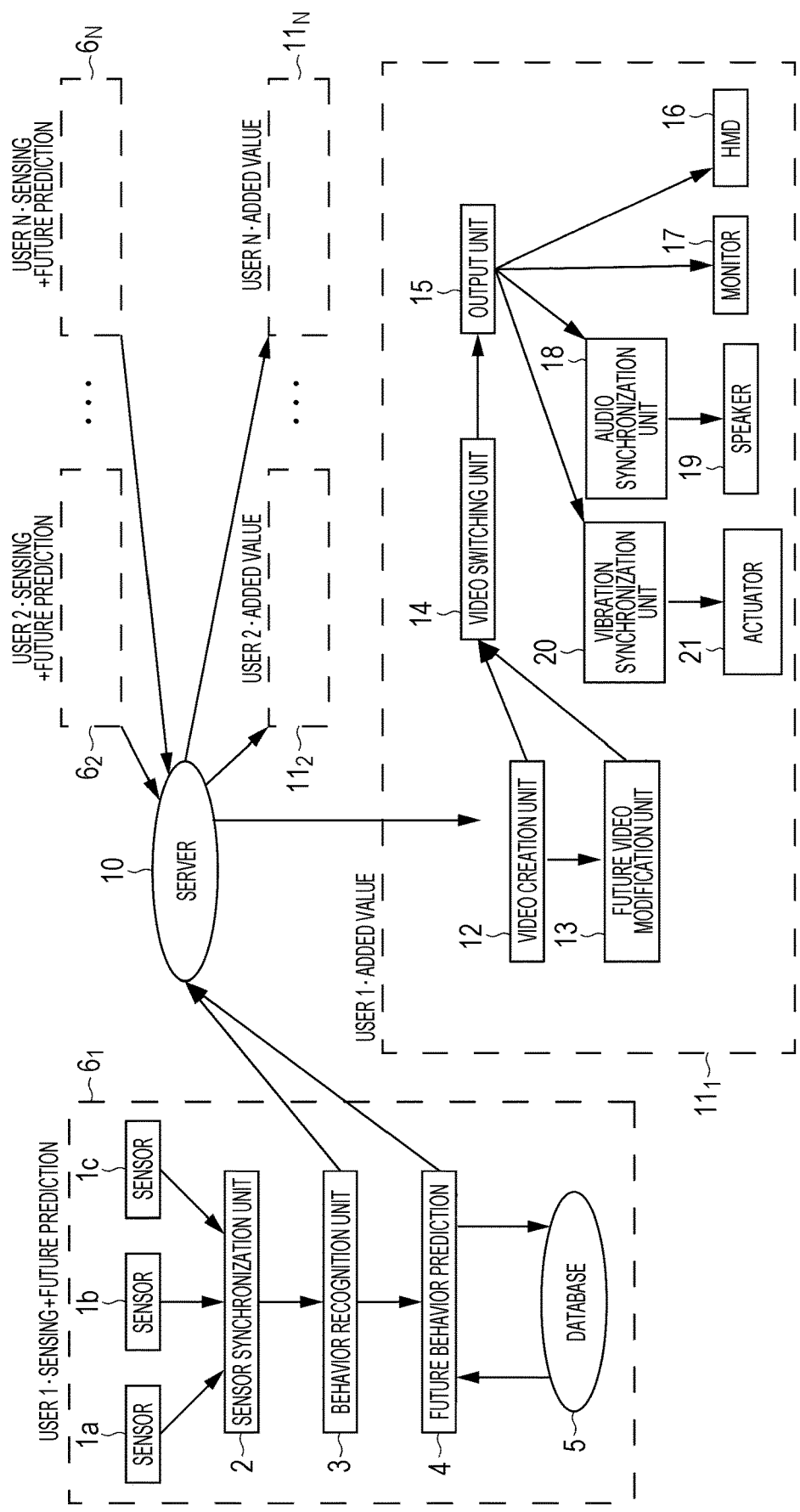
FIG. 6 is a block diagram showing another example of the overall configuration of the information processing device according to the present technology.

The system shown in FIG. 5 is applied to a single user. However, a system corresponding to multiple users can be configured with the present technology. FIG. 6 shows a system configuration for multiple users. A sensing and future predicting unit $6_1$ surrounded by the broken line is a configuration related to a user 1.

As described above, the sensing and future predicting unit $6_1$ includes sensors $1a$, $1b$, and $1c$, a sensor synchronization unit 2, a behavior recognition unit 3, a future behavior prediction unit 4, and a database 5. Information on the position and posture as well as behavior of the whole body or a specific part output from the behavior recognition unit 3 of the sensing and future predicting unit $6_1$ is accumulated in a server 10. Information on the position and posture of the whole body or a specific part up to a few seconds ahead output from the future behavior prediction unit 4, too, is accumulated in the server 10.

Sensing and future predicting units $6_2$ to $6_N$ are provided in relation to the other users (users 2 to N). The output of a behavior recognition unit and a future behavior prediction unit of each of the sensing and future predicting units $6_2$ to $6_N$ is accumulated in the server.

The users 1 to N are respectively provided with added value generation and presentation units $11_1$ to $11_N$ surrounded by a broken line. These added value generation and presentation units $11_1$ to $11_N$ have similar configurations. That is, each added value generation and presentation unit includes a video creation unit 12, a future video modification unit 13, a video switching unit 14, an output unit 15, an HMD 16, a monitor 17, an audio synchronization unit 18, a speaker 19, a vibration synchronization unit 20, and an actuator 21. As a result, it is possible to provide an added value for each user. Note, however, that in an alternative configuration, some of the added value generation and presentation units $11_1$ to $11_N$ may output only video and the others may output only audio.

Each block in the system for a single user (FIG. 5) is implemented by a control circuit provided in the HMD, or is implemented by a personal computer (PC) different from the HMD. Additionally, the blocks are connected by wire or connected wirelessly.

<2. First Embodiment of Present Technology>

Figure 7:
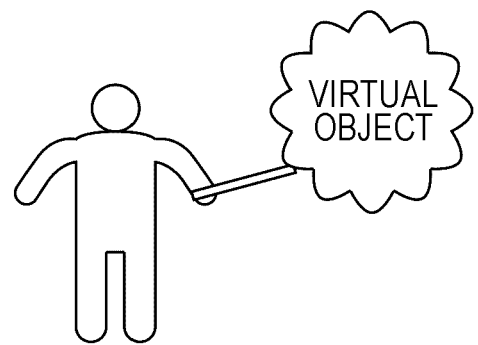
FIG. 7 is a diagram used to describe a first embodiment of the present technology.

A first embodiment of the present technology will be described. The first embodiment creates an illusion of a reaction force when a virtual object is touched in a VR game. That is, as shown in FIG. 7, the user is given an illusion that he/she feels as if he/she is poking when he/she pokes a virtual object. A virtual object is an object in virtual reality (VR) and whose real object does not exist in the real world.

In the processing of the flowchart of FIG. 1, the user's current behavior is recognized, the user's behavior of poking a virtual object (future behavior) is predicted, and an illusion of a reaction force received from the virtual object when the user is poking the virtual object as generated. That is, the added value provided in this case is the illusion of the reaction force received from the virtual object when poking.

The first embodiment can solve a problem of existing VR games. That is, in an existing VR game, even when the user comes into direct contact with a virtual object, there is no reaction force, and there is a large deviation from the reality. Hence, an immersive feeling cannot be obtained. As a result, most of the existing VR games have been in the form of games that do not involve direct contact with VR virtual objects. For example, there have been a VR game that scans across a video 360 degrees, a VR game that shoots a virtual object with a projectile (e.g., gun), and the like. In the first embodiment of the present technology, a reaction force is felt when the user comes into contact with the virtual object, so that a feeling closer to reality can be obtained.

Figure 8:
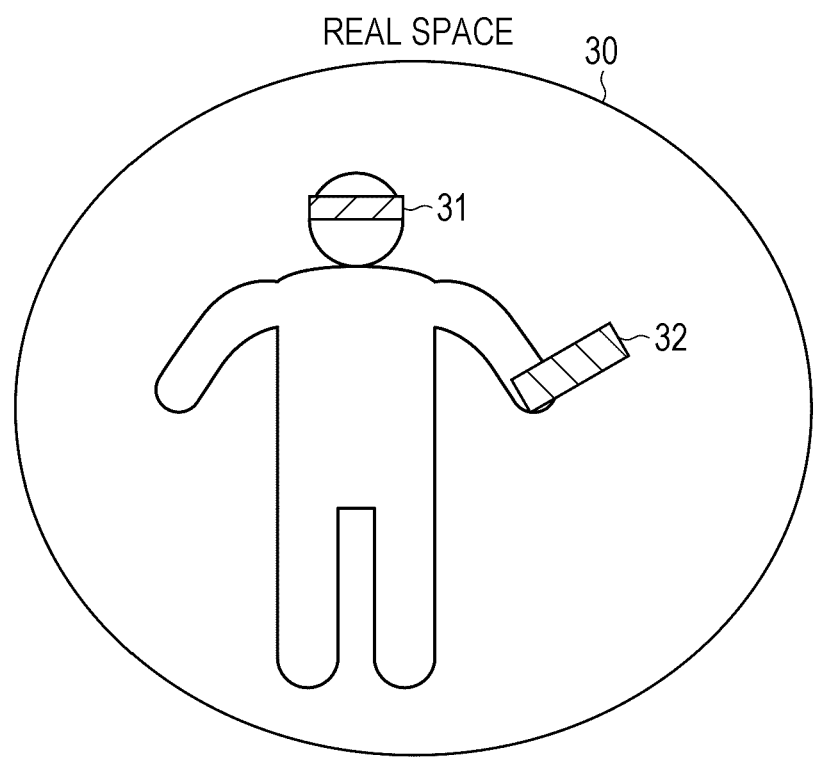
FIG. 8 is a diagram used to describe a VR game according to the first embodiment.

FIG. 8 shows an example of a VR game. The user is wearing an HMD 31 in a real space 30. The user has a sensor 32 in his/her hand. The sensor 32 generates a detection signal indicating the movement of the hand. The detection signal is transmitted wirelessly or by wire to a controller of the HMD 31. The user can see a VR video displayed on a display of the HMD 31. In this VR video, a video including a virtual sword that moves in response to the movement of the hand and an enemy (virtual object) like a monster that needs to be attacked with the sword are displayed.

When the user swings the sensor 32 in the real space 30, the sword will be swung in the VR, and the enemy will be cut by the sword. As explained below, the first embodiment can give the illusion that the user has slashed the enemy even though the user slashed air in the real space 30.

In the first embodiment, a tactile motion illusion is used to create an illusion of the reaction force when a sword touches a virtual object such as a monster. In the example of the reaction force illusion using the tactile motion illusion, a device that presents a video linked to the actual movement is prepared, and the video linked to the recognized actual movement is delayed at an appropriate timing. It is possible to give the user an illusion that a reaction force is generated by an element in the video, instead of letting the user feel that the link in the video is delayed.

In the above-mentioned example of the VR game, in a case of slashing an enemy with a sword, movement is delayed from the movement of the user only while the sword passes through the enemy. However, the tactile motion illusion has a problem that inhibits simple adaptation to VR. In order to utilize the tactile motion illusion, it is necessary to shift the video linked to the actual movement. Accordingly, in the case of an experience in which a motion affects the VR game in real time (called real-time VR), the difference between the actual motion and the video delay becomes a problem.

Figure 9:
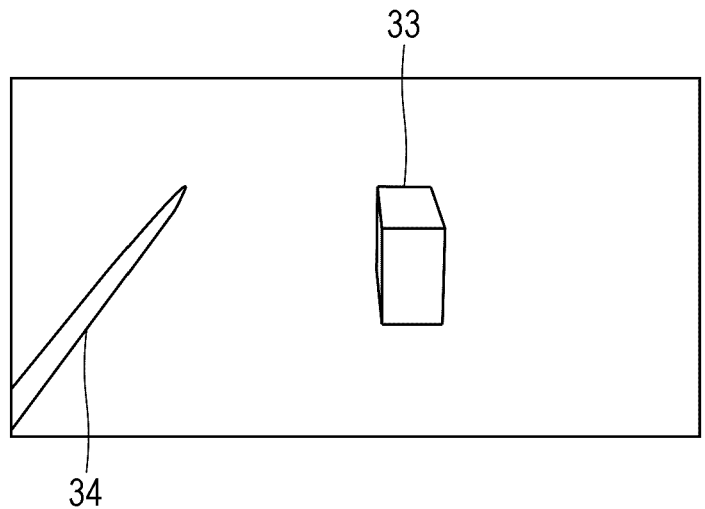
FIG. 9 is a diagram showing a presentation screen of a VR game.
Figure 10:
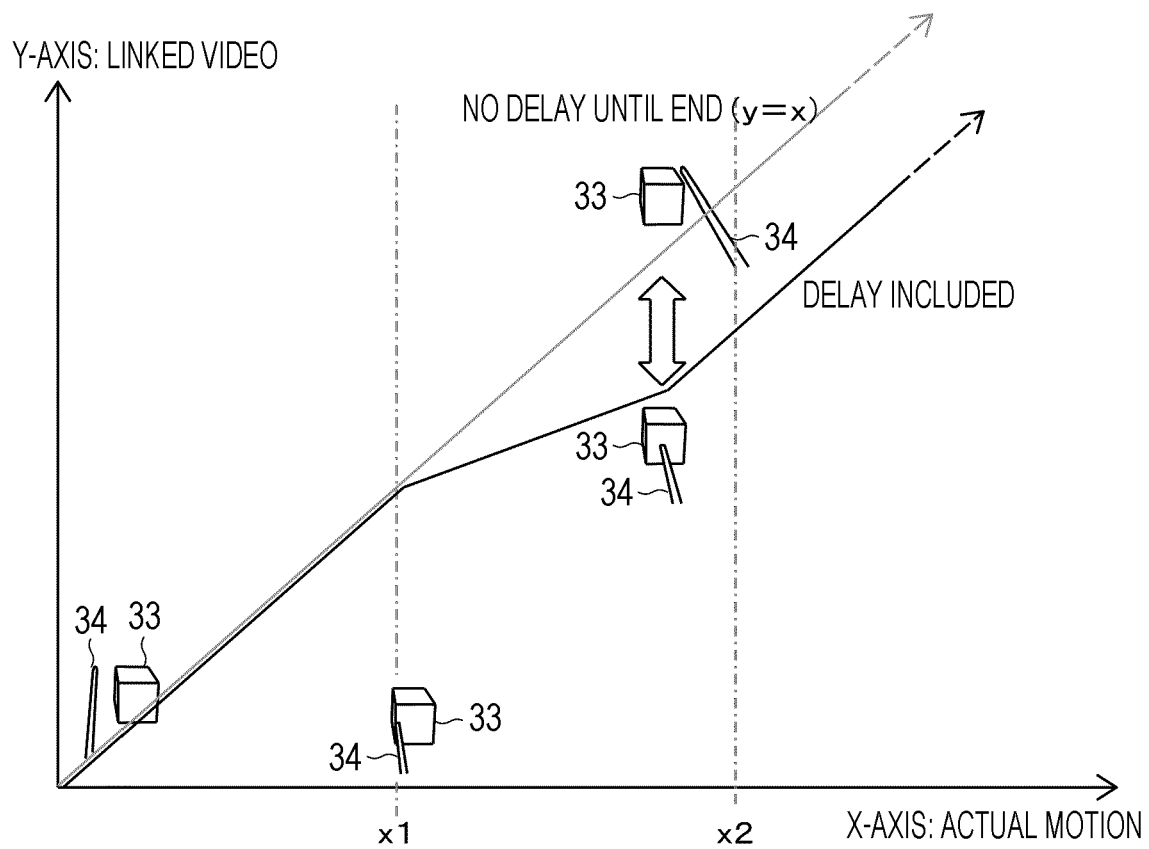
FIG. 10 is a diagram for describing the flow of motion of a sword slashing a virtual object in a VR game.

This point will be described with reference to FIGS. 9 and 10. FIG. 9 is an explanatory drawing in a case of slashing a virtual object (corresponding to enemy) 33 with a sword 34. FIG. 10 is a diagram showing a video in which the X-axis shows the actual motion and the Y-axis shows the linked video. The movement of the sword 34 is linked to the movement of the user in real space, and the diagram indicates that when the virtual object 33 is slashed, the movement of the sword 34 lags behind the movement of the user from a slash start timing (segment point) x1 to a slash end timing x2 (segment point) (i.e., while passing through virtual object 33). If there is no delay in the video and the actual motion and the video are linked, the transition is linear with y=x. If there is a delay in the video, the transition partially becomes y=Ax(1>A>0).

However, in the method shown in FIG. 10, since the generated delay always remains, the user recognizes that the video is delayed rather than being given the illusion that it is a reaction force. For example, in the video, the video of the previous slashing motion may be played when the next slashing operation is started in actual motion.

Figure 11:
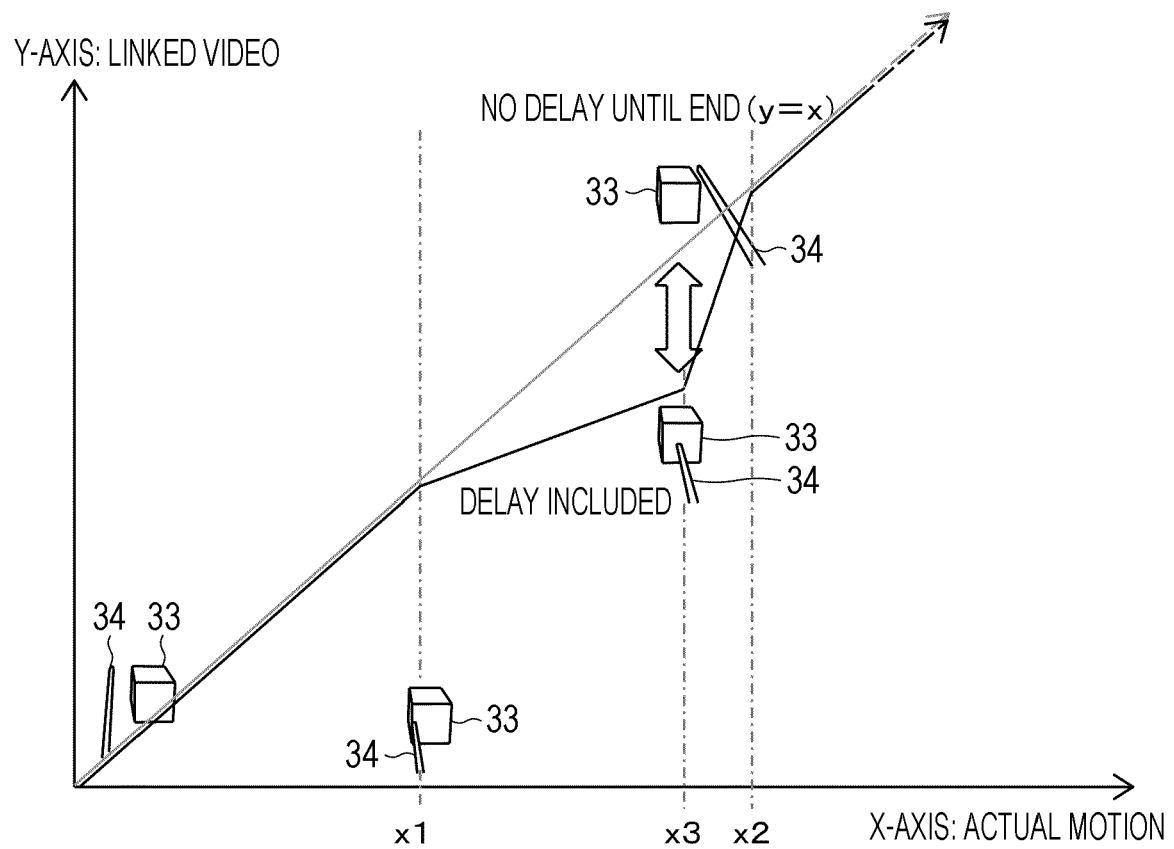
FIG. 11 is a diagram for describing a flow of motion of a sword slashing a virtual object in a VR game according to the first embodiment of the present technology.

The first embodiment of the present technology can solve such a problem. The above will be described with reference to FIG. 11. A future behavior from the user's behavior recognition at the segment point x1 to the segment point x2 is predicted in advance. The time point x1 is a timing that seems to be appropriate as a segment point of a behavior such as the beginning of slashing, and the time point x2 is a timing that seems to be appropriate as a segment point of a behavior such as the end of slashing. The time point x1 is a control (or prediction) start time point, and the time point x2 is a control (or prediction) end time point.

The delay and fast forward of the video are controlled in the control section of x1 to x2, so that the movement of the video (sword 34) is partially delayed from the user's movement, and, at the time point of x2, this delay of the video is eliminated or made so small that it cannot be sensed. That is, the video is delayed in the period of x1 to x3, and the video is fast-forwarded in the period of x3 to x2. At the slash end timing x2, there is no delay in the video. Hence, the actual slashing motion and the movement of the sword 34 can be linked from and after the time point x2. Accordingly, the user does not recognize that the video is simply delayed.

Figure 12:
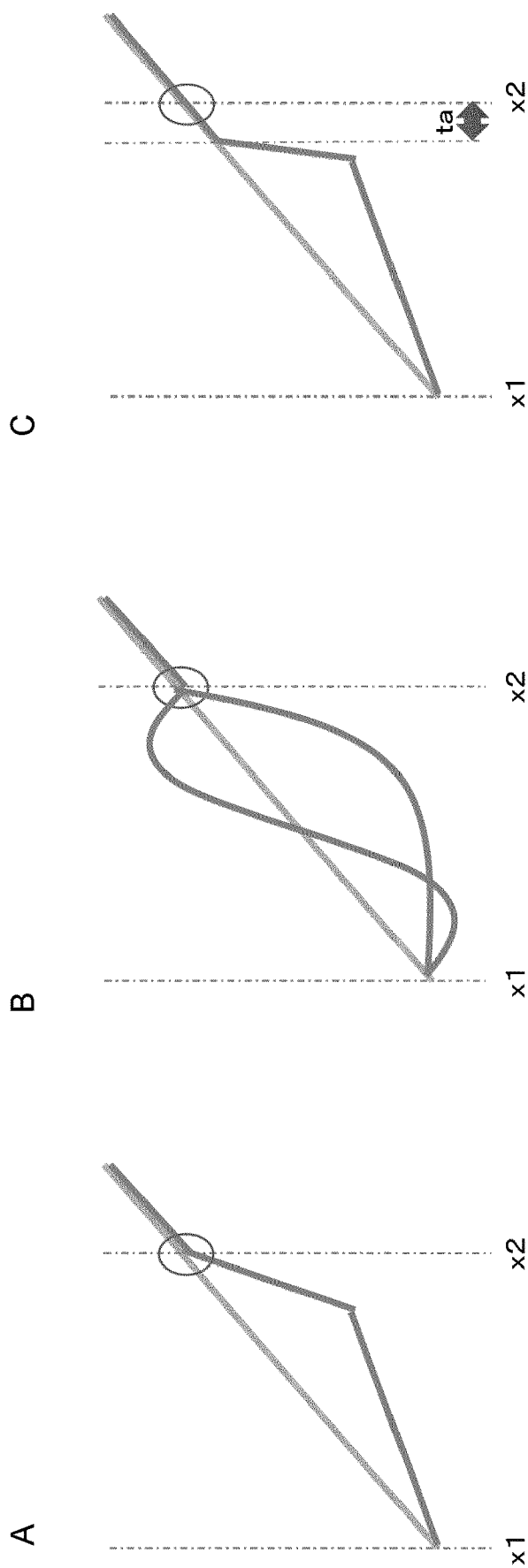
FIGS. 12A, 12B, and 12C are diagrams each showing a mode of control in a control section.

Some examples of delay control modes in the control section (x1 to x2) will be described with reference to FIG. 12. FIG. 12A shows the above-mentioned example, in which the video is delayed from the actual movement from the control start time point x1 and the video movement is accelerated from the time point x3 near the time point x2, so that there is no delay at the time point x2. This is an example of linearly controlling the speed of video movement.

FIG. 12B is an example of controlling the delay between the actual movement and the video with a non-linear function instead of the linear control. It is also possible to temporarily show a future video (video ahead of actual motion). Moreover, as shown in FIG. 12C, there may be a difference to between the end x2 of the predicted section and the time point at which the actual motion and the video are matched.

Application examples that can be handled by the delay control of the first embodiment will be described.

Figure 13:
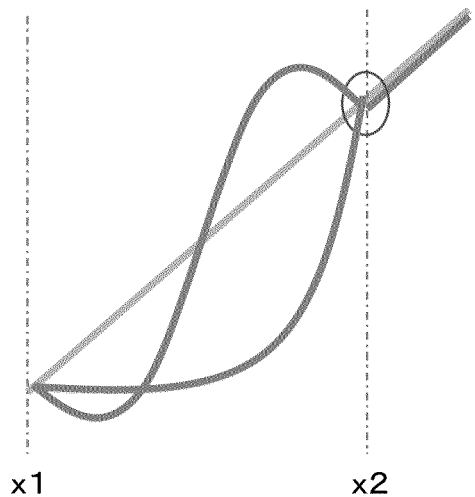
FIG. 13 is a diagram used for describing an application example of the first embodiment.

It is possible to give an illusion of physical properties such as differences in the hardness of virtual objects. As shown in FIG. 13, the hardness can be changed by controlling the delay amount. For example, the larger the delay amount, the harder the object appears, or the larger the delay amount from immediately after the slash start time point x1, the more viscous the object appears.

Additionally, the predicted trajectory and length of object contact time can be used to estimate the user's intention and perform control with appropriate delay amounts for objects with the same hardness. For example, the time up to the next segment point is controlled, so that 80 frames are required to reach the segment point (beginning of next slash) for a large swing and 40 frames are required to reach the next segment point for a small swing. In the case of a small swing, it is predicted that the user wants to slash continuously compared to the case of a large swing, and the delay amount is reduced to support continuous slashing. Note that the user's intention can be estimated by learning past data in advance.

As described above, the first embodiment is an embodiment that enables an experience of directly touching a virtual object by using the tactile motion illusion in real-time VR. Moreover, since it is possible to predict future behavior, taking the use case as an example, it is possible to predict a moment when a virtual object and a sword come into contact with each other. Hence, it becomes possible to create a video of the exact timing, and by combining vibration, sound, or the like with the video, it becomes possible to create an illusion of reaction force by cross-modal perception.

<3. Second Embodiment of Present Technology>

Next, a second embodiment of the present technology will be described. In the second embodiment, a scene that does not occur unless the timings of multiple people match in VR is arbitrarily created by controlling the timings. Similar to the flowchart of FIG. 1, The processing flow of the second embodiment is to predict the future behavior of the user and control the timing to provide a video different from the actual movement as an added value. Thus, it is possible to arbitrarily create a scene that rarely occurs.

Figure 14:
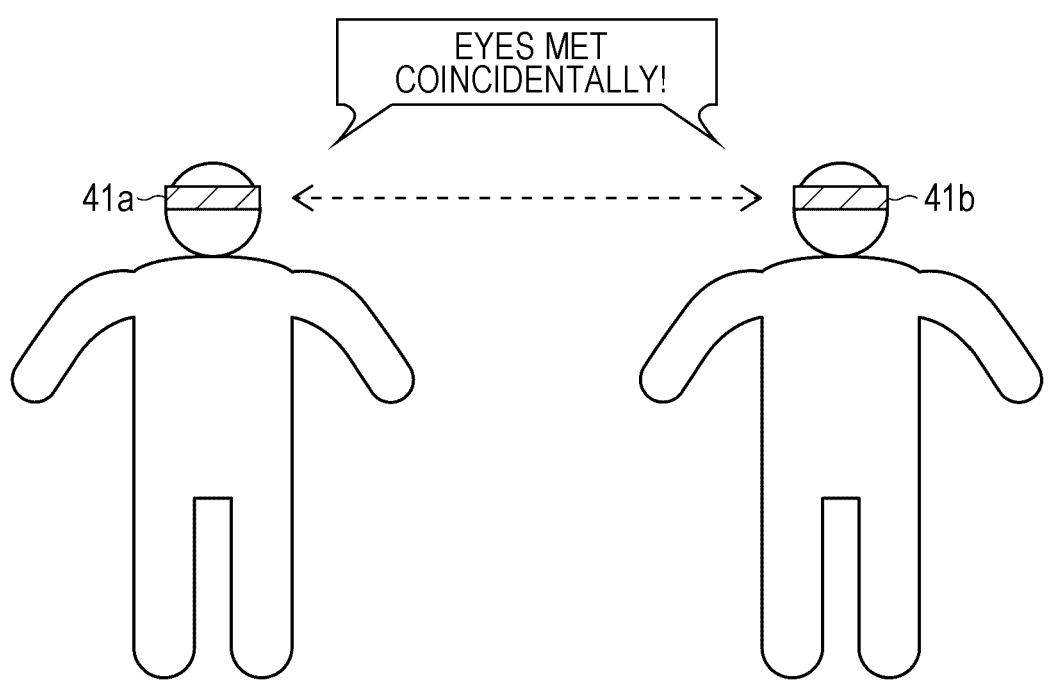
FIG. 14 is a diagram used for describing a second embodiment.
Figure 15:
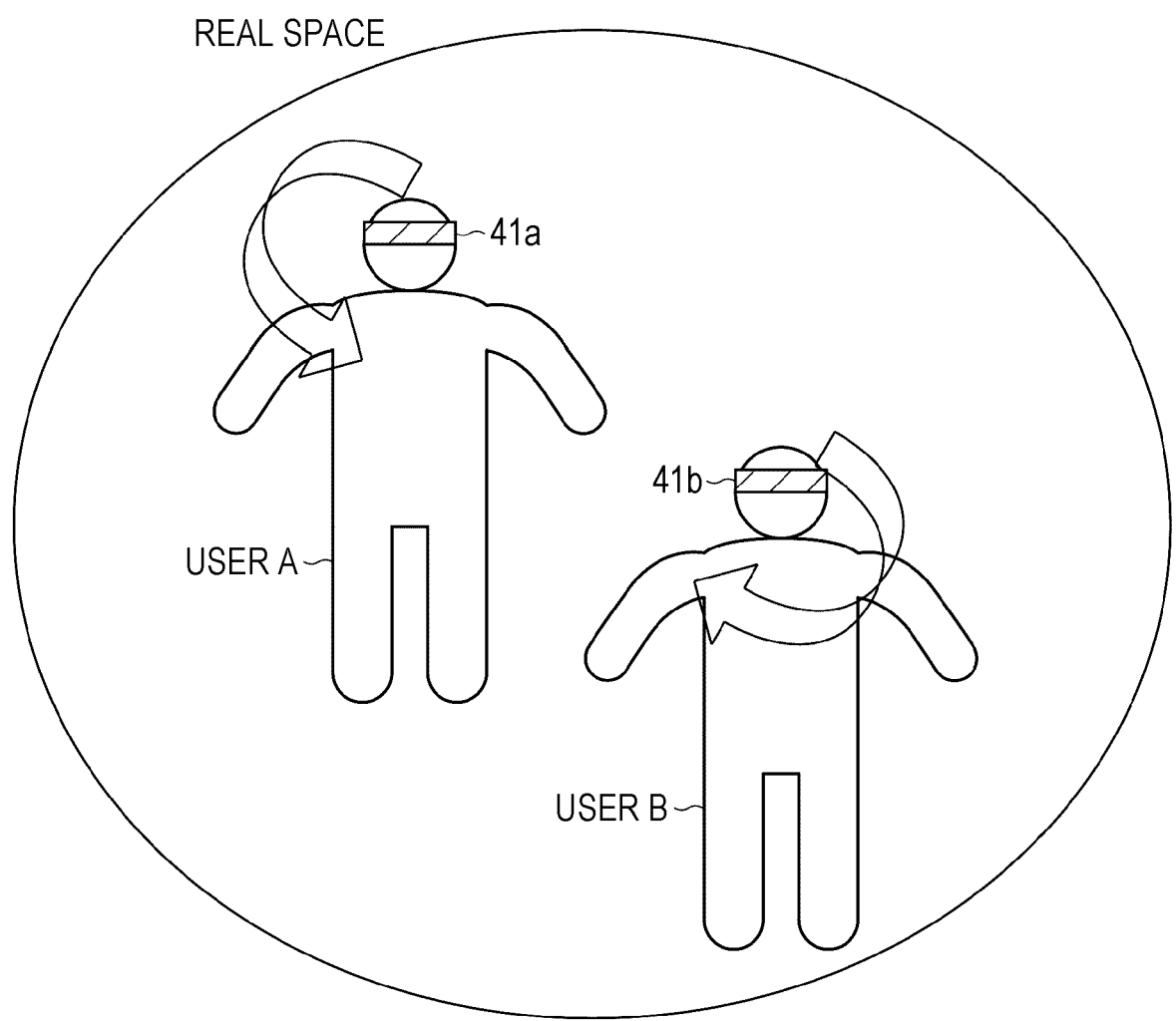
FIG. 15 is a diagram used for describing the second embodiment.

For example, as shown in FIG. 14, in a VR in which a user wearing an HMD 41a and a user wearing an HMD 41b are present, a scene in which the eyes of the two people coincidentally meet is provided. Such a scene cannot be obtained unless the timings of turning of the two people match. Here, as long as the line-of-sight of the two people seems to match, there can be a slight difference between the timings of turning of the two people. As shown in FIG. 15, in real space, user A wearing the HMD 41a and user B wearing the HMD 41b each performs a motion of turning around. In a VR in which people corresponding to user A and user B appear, a video in which the line-of-sight of the two people matches is not presented unless the timings of turning of both users match. As another example, in a boxing VR game, problems such as lack of fun and the absence of a realistic feeling will occur unless the timing of punching and the timing of avoiding are very close.

Figure 16:
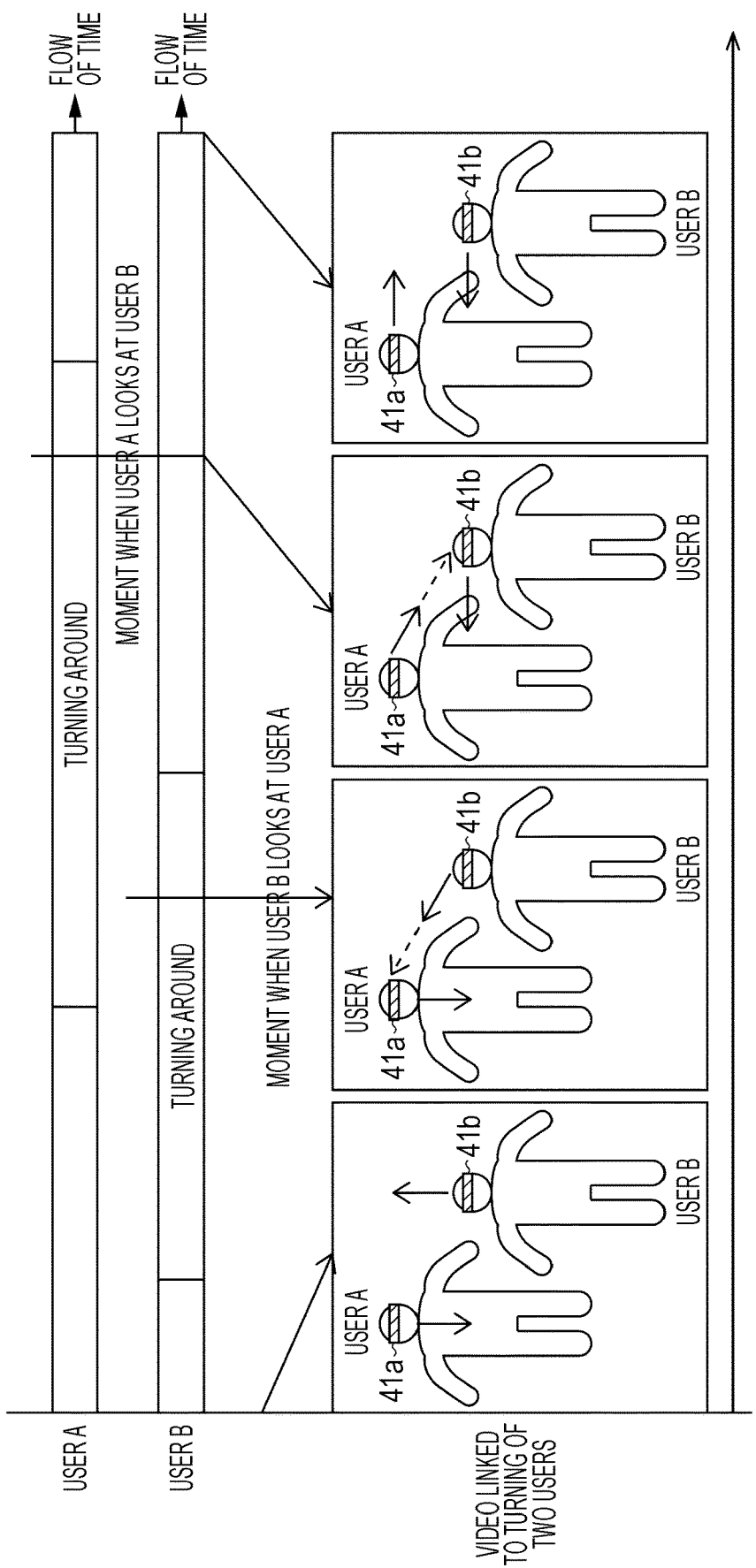
FIG. 16 is a diagram for describing a problem in a case where the second embodiment is not applied.

The second embodiment of the present technology will be described further. FIG. 16 is a timing chart for describing a case where the second embodiment of the present technology is not applied. The motion of each of user A and user B and a video linked to turning of the two users are shown. The two users are asked to turn around at an appropriate timing, the turning is recognized, and a linked video is projected on the HMDs 41a and 41b. The turning behavior can be detected by a gyro sensor and accelerometer provided in the HMD, surrounding video cameras, and the like.

Initially, user A and user B are looking in different directions. Next, in the moment when user B turns around and looks at user A, user A is still looking in another direction, and the eyes of the two people do not meet. Next, the moment user A turns around and looks at user B, user B is already looking in another direction, so the eyes of the two people do not meet. Moreover, after that, user A and user B are looking in different directions. That is, there is the problem that the scene where the eyes meet does not occur unless the timings of turning of the two users match.

Figure 17:
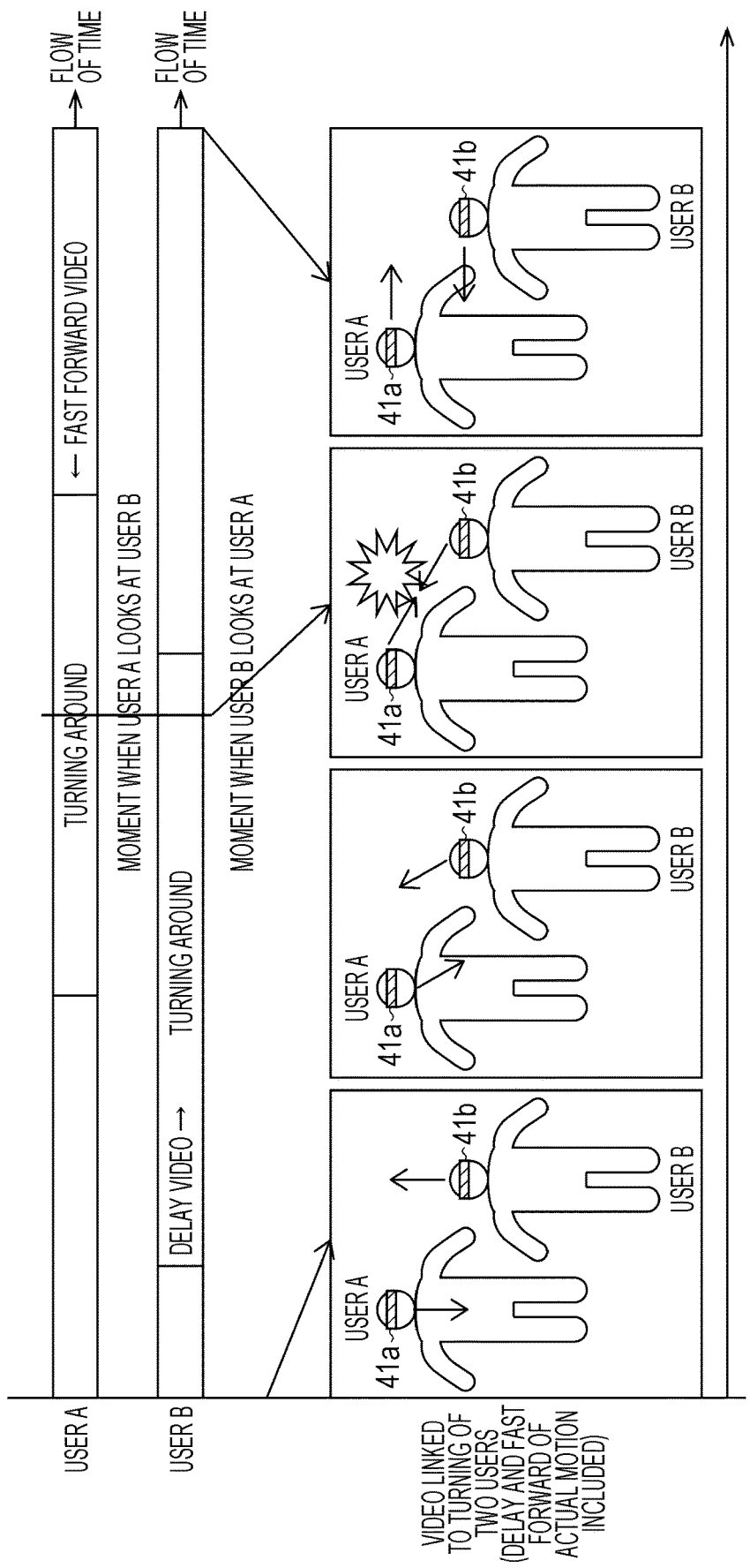
FIG. 17 is a diagram used to describe the second embodiment.

On the other hand, FIG. 17 shows processing of the second embodiment of the present technology. The timing at which the two face each other is determined by future prediction. User B's video is delayed to make the turning period appear longer. User A's video is fast-forwarded to make the turning period appear shorter. As a result, the moment when user A sees user B and the moment when user B sees user A can be matched. That is, it is possible to present a video in which the eyes of the two people meet.

The processing of the second embodiment will be described in relation to the flowchart of FIG. 1 described above. In step ST1, multiple sensors are synchronized, and then in step ST2, the turning motions of the two people are recognized.

In step ST3, the timing at which the turning of the two people match and the timing at which the turning end are determined by future prediction.

In step ST4, a video delayed or fast-forwarded from the actual turning motion is shown. In the middle of the turning, the actual movement and the video are partially shifted. At the end of the turning, the actual movement and the video match. It is possible to present, as an added value, a video in which the eyes of two people meet when they turn around.

As described above, in the second embodiment, real-time VR can be used to arbitrarily create a scene that does not occur unless the timings of multiple people match. Note that it is also possible to control only one video instead of controlling both of the videos of user A and user B.

<4. Third Embodiment of Present Technology>

A third embodiment of the present technology will be described. The third embodiment mitigates a communication failure. Communication failures include communication delay, communication disconnection, and the like. In the case of a battle game with a remote location, when a communication failure occurs, the game itself can be continued without delay on the basis of predicted behaviors of the opponent. The third embodiment can provide an added value of mitigating a communication failure.

Figure 18:
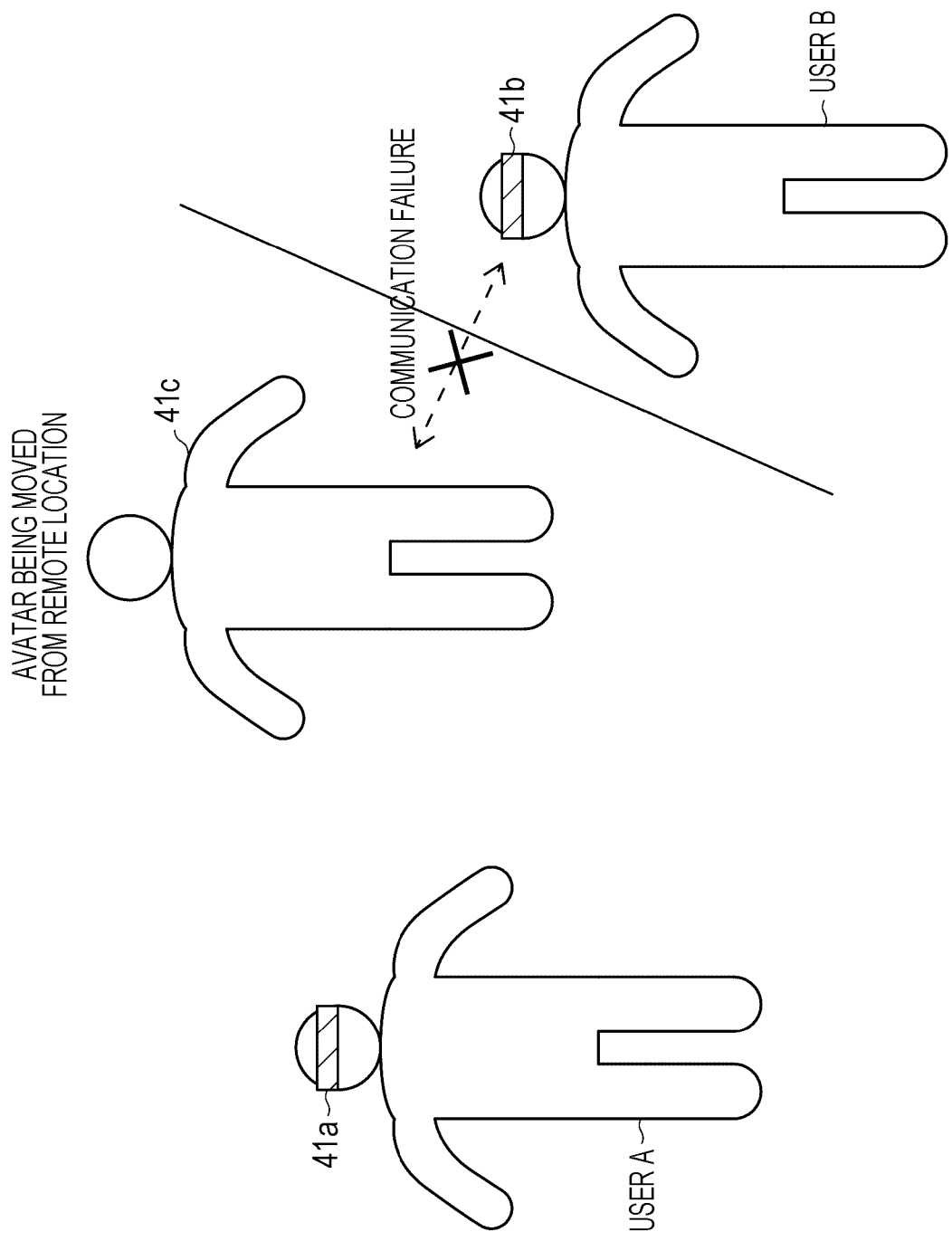
FIG. 18 is a diagram used for describing a third embodiment.

FIG. 18 shows an outline of an online game. In a case where user A wearing an HMD 41a and user B wearing an HMD 41b are competing against each other, an avatar of user B is set. User B is moving the avatar through communication. If this communication fails, the avatar will not be able to move properly. In the third embodiment, in that case, the game can be continued without delay by predicting the behavior of the opponent user B and moving the avatar.

The processing of the third embodiment will be described in relation to the flowchart of FIG. 1 described above. In step ST1, multiple sensors are synchronized, and then in step ST2, the behavior of the opponent is recognized.

In step ST3, in a case where the opponent's behavior cannot be obtained due to a communication failure, a behavior based on future prediction complements the movement of the avatar for a few seconds until the failure is eliminated.

<5. Fourth Embodiment of Present Technology>

A fourth embodiment of the present technology will be described. In the fourth embodiment, a personal computer (PC) uses future prediction to entertain the user. The user's behavior is predicted, and adjustment is made unbeknownst to the user, so that the user can enjoy the game without stress. The fourth embodiment can provide an added value of seamless difficulty adjustment.

Use cases of the fourth embodiment include a game of hitting a moving target, a game of making a special move in a good situation, and the like. The PC can operate the moving target or the target on which to make a special move, and control the behavior in accordance with the user's future behavior in a way that looks natural, so that the user feels that he/she is good at playing the game.

Figure 19:
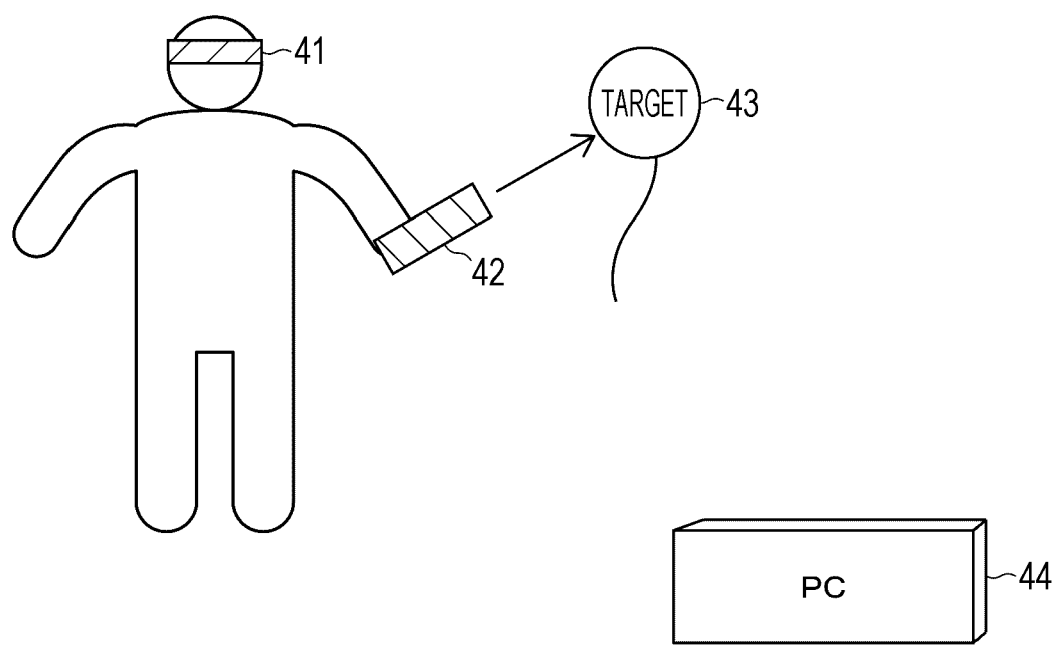
FIG. 19 is a diagram used for describing a fourth embodiment.

FIG. 19 shows an outline of the fourth embodiment. A user wearing an HMD 41 is playing a VR game of shooting a target 43 by operating a controller 42. The sensor (not shown) and a PC 44 recognize the user's movement and predict the part to be shot. By moving the target 43 to the predicted position, the user can hit the target frequently and feel that he/she has high skills.

Figure 20:
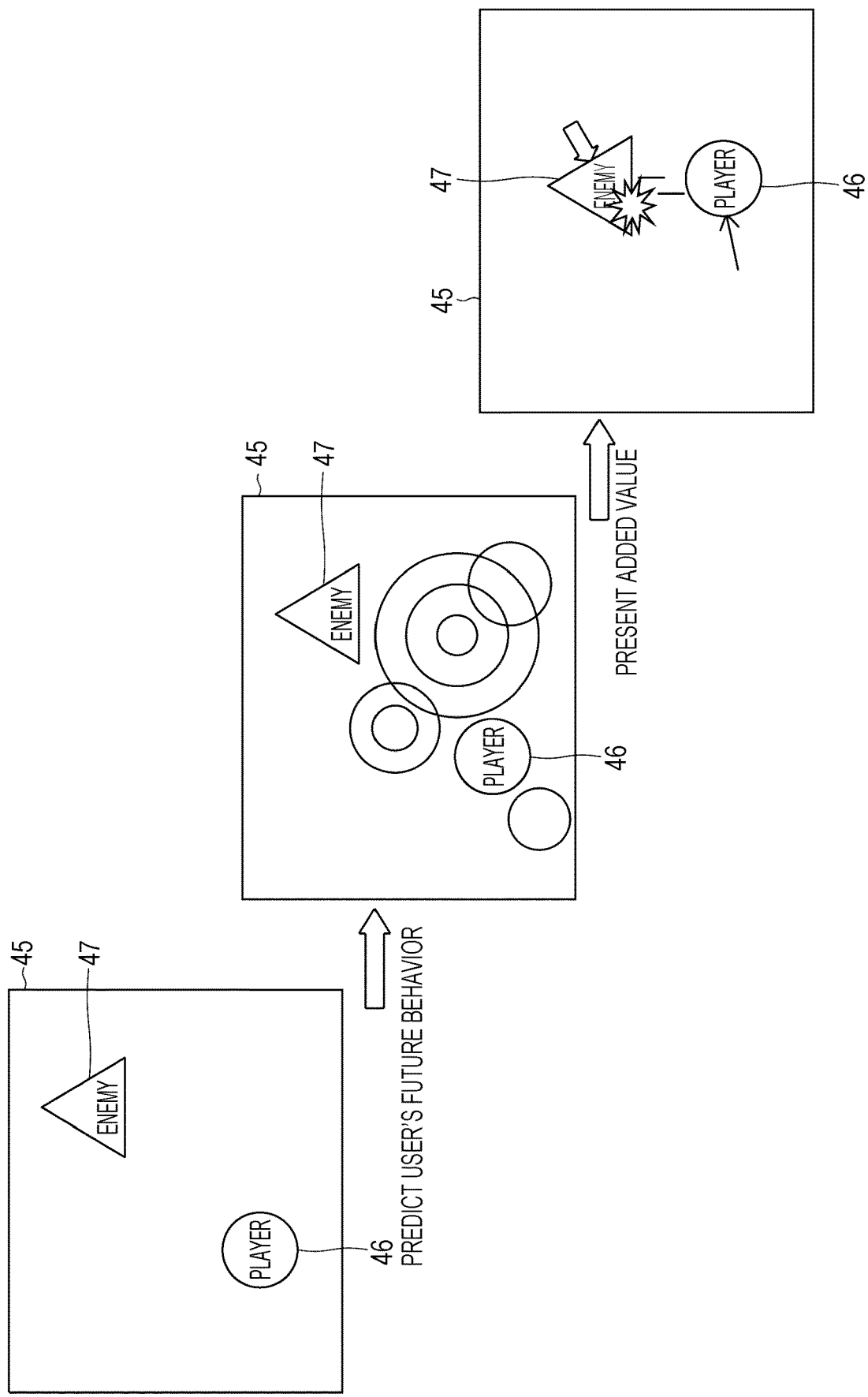
FIG. 20 is a diagram used for describing the fourth embodiment.

An example of the fourth embodiment will be described with reference to FIG. 20. In a battle game of shooting down an enemy aircraft 47 by freely moving an own aircraft 46 in a two-dimensional area 45, the future behavior of the user is predicted. The probability of the user's moving position is represented by a likelihood map. The size of a circle in the likelihood map corresponds to the probability. The enemy aircraft 47 is moved to a position that is easy to hit naturally with reference to the likelihood map of the future motion of the position of the operation target (own aircraft). Accordingly, the enemy aircraft 47 can be shot down without fail, and the user feels that his/her skill is good.

The processing of the fourth embodiment will be described in relation to the flowchart of FIG. 1 described above. In step ST1, multiple sensors are synchronized, and then in step ST2, a likelihood map of the probability of movement of the own aircraft 46 is created and displayed.

In step ST3, the own aircraft 46 is moved to a position with a high probability. At the same time, the enemy aircraft 47 is moved to a position where it can be easily shot down by the own aircraft 46 in the aforementioned position.

<5. Fifth Embodiment of Present Technology>

Figure 21:
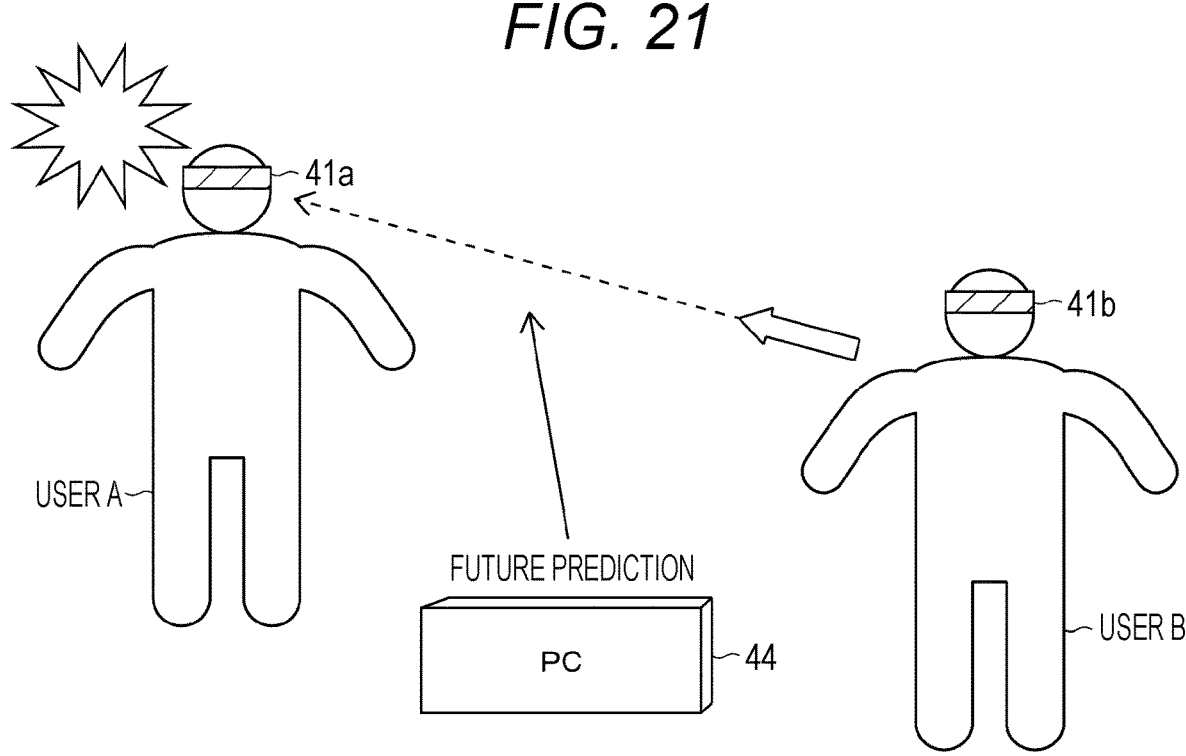
FIG. 21 is a diagram used for describing a fifth embodiment.

A fifth embodiment of the present technology will be described. The fifth embodiment utilizes future prediction in a battle game between users. As shown in FIG. 21, in a battle game between user A wearing an HMD 41*a* and user B wearing an HMD 41*b,* a PC 44 predicts the future behavior of the opponent user B. As a result of the prediction, user A is informed by displaying a place where user B intends to shoot, for example. User A can easily prevent being shot by user B. The fifth embodiment can provide an added value of directly presenting a future prediction result.

The processing of the fifth embodiment will be described in relation to the flowchart of FIG. 1 described above. In step ST1, multiple sensors are synchronized, and then in step ST2, the future behavior of the opponent is predicted.

In step ST3, the position of a future behavior such as shooting is displayed and notified.

As a use case of the fifth embodiment, anyone can play the game like a master. For example, it is possible to brilliantly avoid the opponent's attack (bullet) and fight like a professional.

Figure 22:
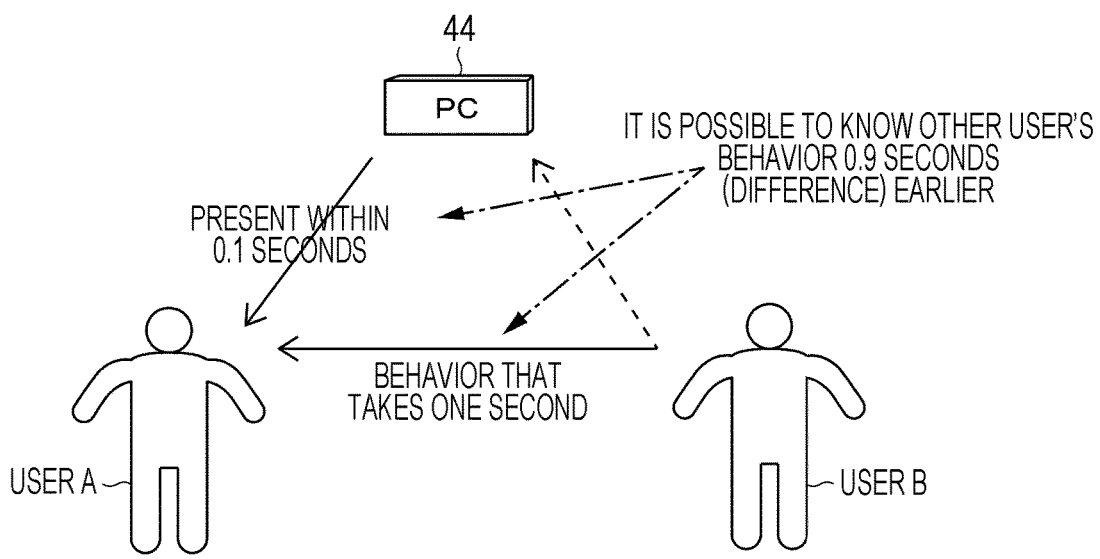
FIG. 22 is a diagram used for describing the fifth embodiment.

An example of utilization of the fifth embodiment will be described with reference to FIG. 22. User A and user B play a battle game. The opponent user B performs a behavior that takes one second. The PC 44 predicts the future behavior of user B one second later. The predicted result is presented to user A. Assuming that the time required for this presentation is 0.1 seconds, user A can know the behavior to be performed by the other user B 0.9 seconds ahead of time. As a result, user A can deal with the behavior of user B in advance.

For example, user A can know in advance in which direction user B points the muzzle. As the presentation method to user A, the likelihood map in the fourth embodiment can be used.

<7. Modification>

Note that the function of the processing device in the above-described embodiments can be recorded as a program on a recording medium such as a magnetic disk, a magneto-optical disk, or a ROM. Accordingly, the function of the information processing device can be implemented by reading the recording medium with a computer and executing it with a micro processing unit (MPU), a digital signal processor (DSP), or the like.

While the embodiment of the present technology has been specifically described above, the present technology is not limited to the above-described embodiment, and various modifications based on the technical idea of the present technology are possible. Additionally, the configurations, methods, steps, shapes, materials, numerical values, and the like mentioned in the above-described embodiment are merely examples, and configurations, methods, steps, shapes, materials, and numerical values different from these may be used as necessary. For example, the present technology can be applied not only to VR games but also to fields such as education and medical use.

Note that the present technology can also be configured in the following manner.

(1)

An information processing device including:
a behavior recognition device that recognizes a behavior;
a prediction unit that predicts a future behavior using a recognition result of the behavior recognition device;
an added value generation unit that generates an added value related to the predicted future behavior; and
a presentation unit that presents the generated added value.

(2)

The information processing device according to (1), in which
the added value generation unit modifies a video in a control section between segment points of a future behavior.

(3)

The information processing device according to (2), in which
in the control section, an illusion of a reaction force is created by using a tactile motion illusion by delaying and fast-forwarding the video from the recognized behavior, and after passage of the control section, the delay from the recognized behavior is hardly perceptible.

(4)

The information processing device according to (1) further including at least two information processing devices according to (1), in which
control is performed so that timings of future behaviors predicted by the respective information processing devices are substantially the same.

(5)

The information processing device according to (1) further including at least two information processing devices according to (1), in which
in a case of playing a game in a remote location using the information processing device, a future behavior of an opponent is predicted and an avatar is moved according to the prediction result to mitigate a communication failure.

(6)

The information processing device according to (1) further including at least two information processing devices according to (1), in which
a future behavior of one information processing device is predicted to control a behavior of another information processing device.

(7)

The information processing device according to any one of (1) to (6), in which
the behavior recognition device includes a sensor that is displaced in conjunction with a behavior.

(8)

The information processing device according to any one of (1) to (6), in which
the behavior recognition device includes a camera that captures a behavior.

(9)

The information processing device according to any one of (1) to (8), in which information regarding a behavior is at least one of a real value of the behavior, a class to which the behavior belongs, and a transition probability of the behavior.

(10)

The information processing device according to any one of (1) to (9), in which
the prediction unit includes an intention of a behavior that is predictable from a database of past behaviors.

(11)

An information processing method including:
recognizing a behavior by a behavior recognition device;
predicting a future behavior by a prediction unit using a recognition result of the behavior recognition device;
generating an added value related to the predicted future behavior by an added value generation unit; and
presenting the generated added value by a presentation unit.

(12)

A program that causes a computer to execute an information processing method including:
recognizing a behavior by a behavior recognition device;
predicting a future behavior by a prediction unit using a recognition result of the behavior recognition device;
generating an added value related to the predicted future behavior by an added value generation unit; and
presenting the generated added value by a presentation unit.

REFERENCE SIGNS LIST 1a, 1b, 1c Sensor
3 Behavior recognition unit
4 Future behavior prediction unit
5 Database
6, 6$_1$ to 6$_N$ Sensing and future predicting unit
11 Added value generation and presentation unit
12 Video creation unit
13 Future video modification unit
14 Video switching unit
15 Output unit

The invention claimed is:

1. An information processing device comprising:
a behavior recognition device configured to recognize a behavior;
a prediction unit configured to predict a future behavior using a recognition result of the recognized behavior;
an added value generation unit configured to generate an added value related to the predicted future behavior; and
a presentation unit configured to present a video of the generated added value,
wherein the added value generation unit is further configured to modify the video in a control section of the video, the control section starting at a start point of a future behavior and ending at an end point of the future behavior,
wherein the added value generation unit is further configured to modify the video in the control section by delaying the video starting from the start point and ending at an intermediate point between the start point and the end point, and fast-forwarding the video starting from the intermediate point and ending at the end point, and
wherein the behavior recognition device, the prediction unit, the added value generation unit, and the presentation unit are each implemented via at least one processor.

2. The information processing device according to claim 1 further comprising at least two information processing devices according to claim 1, wherein control is performed so that timings of future behaviors predicted by the respective information processing devices are substantially same.

3. The information processing device according to claim 1 further comprising at least two information processing devices according to claim 1, wherein in a case of playing a game in a remote location using the information processing device, a future behavior of an opponent is predicted and an avatar is moved according to a result of the prediction to mitigate a communication failure.

4. The information processing device according to claim 1 further comprising at least two information processing devices according to claim 1, wherein a future behavior of one information processing device is predicted to control a behavior of another information processing device.

5. The information processing device according to claim 1, wherein the behavior recognition device includes a sensor that is displaced in conjunction with a behavior.

6. The information processing device according to claim 1, wherein the behavior recognition device includes a camera that captures a behavior.

7. The information processing device according to claim 1, wherein information regarding a behavior is at least one of a real value of the behavior, a class to which the behavior belongs, and a transition probability of the behavior.

8. The information processing device according to claim 1, wherein the prediction unit includes an intention of a behavior that is predictable from a database of past behaviors.

9. An information processing method comprising:
recognizing a behavior;
predicting a future behavior using a recognition result of the recognized behavior;
generating an added value related to the predicted future behavior;
presenting a video of the generated added value; and
modifying the video in a control section of the video, the control section starting at a start point of a future behavior and ending at an end point of the future behavior,
wherein the modification of the video in the control section includes modifying the video in the control section by delaying the video starting from the start point and ending at an intermediate point between the start point and the end point, and fast-forwarding the video starting from the intermediate point and ending at the end point.

10. A non-transitory computer-readable medium having embodied thereon a program, which when executed by a computer causes the computer to execute an information processing method, the method comprising:
recognizing a behavior;
predicting a future behavior using a recognition result of the recognized behavior;
generating an added value related to the predicted future behavior;
presenting a video of the generated added value; and
modifying the video in a control section of the video, the control section starting at a start point of a future behavior and ending at an end point of the future behavior,
wherein the modification of the video in the control section includes modifying the video in the control section by delaying the video starting from the start point and ending at an intermediate point between the start point and the end point, and fast-forwarding the video starting from the intermediate point and ending at the end point.

\* \* \* \* \*